United States Patent
Patenaude

(10) Patent No.: US 8,265,093 B2
(45) Date of Patent: *Sep. 11, 2012

(54) MULTI-SERVICE CHANNELIZED SONET MAPPER FRAMER

(75) Inventor: Jean-Marc Guy Patenaude, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/511,000

(22) Filed: Jul. 28, 2009

(65) Prior Publication Data

US 2009/0285242 A1    Nov. 19, 2009

Related U.S. Application Data

(63) Continuation of application No. 10/318,468, filed on Dec. 13, 2002, now Pat. No. 7,567,581.

(60) Provisional application No. 60/420,527, filed on Oct. 23, 2002.

(51) Int. Cl.
*H04L 12/66* (2006.01)
*H04L 12/46* (2006.01)

(52) U.S. Cl. ............... 370/419; 370/465; 370/463

(58) Field of Classification Search ............ 370/359, 370/395.5–395.65, 401–408, 419–421, 465–467
See application file for complete search history.

(56) References Cited

U.S. PATENT DOCUMENTS

| | | | |
|---|---|---|---|
| 4,967,405 A | 10/1990 | Upp et al. | |
| 4,998,242 A | 3/1991 | Upp | |
| 5,040,170 A | 8/1991 | Upp et al. | |
| 5,796,742 A | 8/1998 | Klotzbach et al. | |
| 6,047,002 A | 4/2000 | Hartmann et al. | |
| 6,122,281 A * | 9/2000 | Donovan et al. | 370/401 |
| 6,222,848 B1 | 4/2001 | Hayward et al. | |
| 6,246,702 B1 | 6/2001 | Fellman et al. | |
| 6,385,209 B1 | 5/2002 | Skirmont et al. | |
| 6,414,966 B1 | 7/2002 | Kulkarni et al. | |
| 6,985,488 B2 | 1/2006 | Pan et al. | |
| 6,993,046 B1 | 1/2006 | Hernandez-Valencia et al. | |
| 6,996,125 B2 | 2/2006 | Kfir et al. | |
| 7,031,256 B2 | 4/2006 | Hamlin et al. | |
| 7,031,341 B2 * | 4/2006 | Yu | 370/469 |
| 7,042,904 B2 | 5/2006 | Kamiya | |
| 7,054,324 B1 | 5/2006 | Ben-Zur et al. | |
| 7,173,936 B1 * | 2/2007 | Semaan | 370/395.51 |
| 7,567,581 B2 | 7/2009 | Patenaude | |
| 2004/0076168 A1 | 4/2004 | Patenaude | |

* cited by examiner

*Primary Examiner* — Thai Hoang

(74) *Attorney, Agent, or Firm* — Brinks Hofer Gilson & Lione

(57) ABSTRACT

An embodiment of a multi-service mapper framer device and methods for operating same are described. This device may support the interconnection of synchronous optical networks using the SONET and SDH standards to Ethernet packet networks, and may be capable of mapping up to 2.5 gigabits per second of traffic from a variety of client-side interfaces including time division multiplex T1/E1 and T3/E3 data interfaces, a System Packet Interface, and Ethernet packet data interfaces. The device may support a trunk-side connection using a T3/E3 data interface, and the ANSI T1X1.5 Generic Framing Procedure and ITU X.86 Ethernet-over-SONET Recommendation may also be supported. Functionality to enable Virtual Concatenation with Link Capacity Adjustment Scheme may be included.

20 Claims, 2 Drawing Sheets

MULTI-SERVICE CHANNELIZED SONET MAPPER FRAMER

CROSS-REFERENCE TO RELATED APPLICATIONS/INCORPORATION BY REFERENCE

The present application is a continuation of U.S. patent application Ser. No. 10/318,468, filed Dec. 13, 2002, now U.S. Pat. No. 7,567,581 which makes reference to, claims priority to, and claims benefit of provisional application Ser. No. 60/420,527, "Multi-Service Channelized SONET Mapper Framer", filed Oct. 23, 2002, the complete subject matter of each of which is hereby incorporated herein by reference in its entirety. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

This application is related to the following co-pending application, which is herein incorporated by reference:

| Ser. No. | Title | Filed | Inventors |
| --- | --- | --- | --- |
| 60/419,865 | Multi-Service Ethernet-Over-SONET-Silicon Platform | Oct. 21, 2002 | Patenaude |

BACKGROUND OF THE INVENTION

Aspects of the present invention relate to providing access to broadband communication systems. In particular, certain embodiments relate to an apparatus which provides an interface to connect to broadband synchronous optical networks in order to provide a variety of synchronous and packet network connections.

In the past, a variety of transmission technologies have been used to electronically transfer large amounts of digital information, including both terrestrial and satellite links. Terrestrial facilities that have commonly been used include both buried and above-ground cable, microwave radio and most recently, optical fiber, which offers the largest bandwidth. Networks used for such high capacity data transport systems are typically synchronous networks.

In a synchronous network, data is transmitted from one location to another as a continuous stream of digital information moving from the source to the destination at a constant rate. The stream is organized as a sequence of frames, each frame containing a fixed number of fields in a defined order, each field of the same length. The Synchronous Optical Network (SONET) and Synchronous Digital Hierarchy (SDH) are the principal synchronous optical network standards currently in use. Because no single user normally needs all of the capacity of an optical fiber-based transmission system, the standards have been designed to provide a means to share the bandwidth.

The use of packet networks is growing in popularity due to the flexibility offered by the ability of a packet network to efficiently handle multiple data streams of widely varying bandwidth. Packet networks consist of a mesh of nodes interconnected by links, and data is exchanged in bursts called packets. Packets may contain voice, data, or video information, and can be of varying length. Each of the services supported on a packet network has its own set of requirements including, for example, end-to-end delay, packet loss, and privacy.

Synchronous optical networks are the primary transport mechanism for long distance transmission of information, and are becoming increasingly important in metropolitan areas. At the same time, the use of packet networks is growing rapidly due to their ability to efficiently carry multiple data streams of widely varying bandwidth. The number and variety of data services, the number of users, and the total bandwidth required at any particular user location will grow with time. Some legacy equipment requires lower speed synchronous time-division-multiplexed (TDM) network connections, while other equipment requires a packet network interface. As user demand for higher bandwidth connections grows and synchronous optical networks expand, support for connections of varying bandwidth will become increasingly important. Consequently, there is an increasing need for cost-effective and efficient means of interfacing synchronous optical networks and packet networks.

The functionality that may be needed to connect a SONET or SDH synchronous optical network and a packet network includes that of an Add-Drop Multiplexer (ADM) or terminal, a Digital Cross-Connect (DCC), and a Multi-Service Provisioning Platform (MSPP). ADMs may be used to transport SONET or SDH traffic on network ring topologies. The ADMs are nodes on such rings that are used to arbitrate (add or drop) traffic to or from the ring. A SONET/SDH terminal performs a function similar to that of an ADM except that the network connection is not in a ring configuration. A terminal terminates a high-speed point-to-point SONET path, and hands off a number of lower rate lines and paths on the client side. A DCC is a circuit switch used to switch and groom traffic between different lines and paths. A network may include several ADMs and terminals to arbitrate or terminate traffic along rings or point-to-point connections, and a DCC will be used to switch the traffic between all the paths. A Multi-Service Provisioning Platform combines the functionality of the DCC, the ADM, and the terminal along with the ability to support data protocols such as Ethernet to the client users.

Consequently, there is a need for a compact and cost-effective means of interconnecting synchronous optical networks and Ethernet packet networks. In addition, it would be advantageous to allow services supported using existing synchronous time division multiplex communication facilities to be supported over synchronous optical networks, in particular, metropolitan area networks. Therefore, a flexible, cost-effective, and efficient solution to the network interconnect problem is of importance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An embodiment of the present invention may comprise at least one network interface for formatting a receive serial data stream, producing a channelized receive data stream, and for formatting a channelized transmit data stream producing a transmit serial data stream; at least one cross-connect for de-multiplexing the channelized receive data stream, producing at least one receive data channel, and for multiplexing at least one transmit data channel, producing the channelized transmit data stream; at least one packet mapper for mapping at least one of the at least one receive data channel, producing a receive packet data stream, and for de-mapping a transmit packet data stream, producing at least one of the at least one transmit data channel; at least one packet data interface for packetizing the receive packet data stream producing a receive packet stream, and for de-packetizing a transmit packet stream into the transmit packet data stream; at least one DS1/E1 data interface for framing at least one of the at least one receive data channel, producing a time division multiplexed receive data stream, and for framing a time division multiplexed transmit data stream producing at least one of the at least one transmit data channel; at least one DS3/E3 data interface for framing at least one of the at least one receive data channel, producing a time division multiplexed receive data stream, and for framing a time division multiplexed transmit data stream producing at least one of the at least one transmit data channel; at least one telecom bus interface for transferring data from at least one of the at least one receive data channel to an external device, and for transferring to at least one of the at least one transmit data channel data from the external device; and at least one microprocessor unit arranged in order to allow information to be exchanged with at least one of the at least one network interface, the at least one cross-connect, the at least one packet mapper, the at least one packet data interface, the at least one DS1/E1 interface, the at least one DS3/E3 interface, and the at least one telecom bus interface.

The at least one network interface of an embodiment in accordance with the present invention may be compatible with the Telcordia GR-253-CORE or corresponding later SONET standard, and may be compatible with the International Telecommunication Union Synchronous Digital Hierarchy standard. It may be capable of supporting at least SONET STS-3 capacity on each of the receive serial data stream and the transmit data stream, and may support automatic protection switching compliant with the American National Standards Institute T1.105.01-5000 or corresponding later standard.

In an embodiment of the present invention, the at least one packet mapper may support virtual concatenation, and may implement a link capacity adjustment scheme. It may also implement the American National Standards Institute T1X1.5 or corresponding later generic framing procedure, and the International Telecommunications Union X.86 or corresponding later Ethernet Over SONET recommendation, and may implement the Internet Engineering Task Force RFC 1662 or corresponding later point-to-point protocol specification. In addition, it may comprise an interface to permit access to external memory.

Another embodiment of the present invention may comprise at least one packet interface compatible with the IEEE 802.3z or later equivalent Gigabit Ethernet standard, and at least one of the at least one DS3/E3 interface may be arranged to operate as a trunk-side interface. Furthermore, each of the outgoing and incoming paths of the at least one telecom bus interface may be of at least STS-3 capacity. The functionality of the multi-service mapper framer may be contained within a single integrated circuit device.

Another aspect of the present invention relates to a method of operating a multi-service mapper framer. A method of operating an embodiment of the present invention may comprise framing a receive serial data stream into a channelized receive data stream; de-multiplexing the channelized receive data stream, producing at least one receive data channel; mapping at least one of the at least one receive data channel, producing a receive packet data stream; packetizing the receive packet data stream producing a receive packet stream; de-packetizing a transmit packet stream into a transmit packet data stream; de-mapping the transmit packet data stream, producing at least one transmit data channel; multiplexing the at least one transmit data channel, producing a channelized transmit data stream; and formatting the channelized transmit data stream producing a transmit serial data stream. Such a method may further comprise collecting at least one statistic related to the packetizing and de-packetizing actions.

The above method may further comprise mapping at least one of the at least one receive data channel to a time-division multiplex receive data channel; multiplexing the time division multiplex receive data channel into a time division multiplex receive signal; framing a time division multiplex transmit signal into a time division multiplex transmit data channel; and de-mapping the time division multiplex transmit data channel into at least one transmit data channel.

In such an embodiment, the framing, de-multiplexing, mapping, packetizing, de-packetizing, de-mapping, multiplexing, and formatting actions may occur within a single integrated circuit device.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

Figure 1:
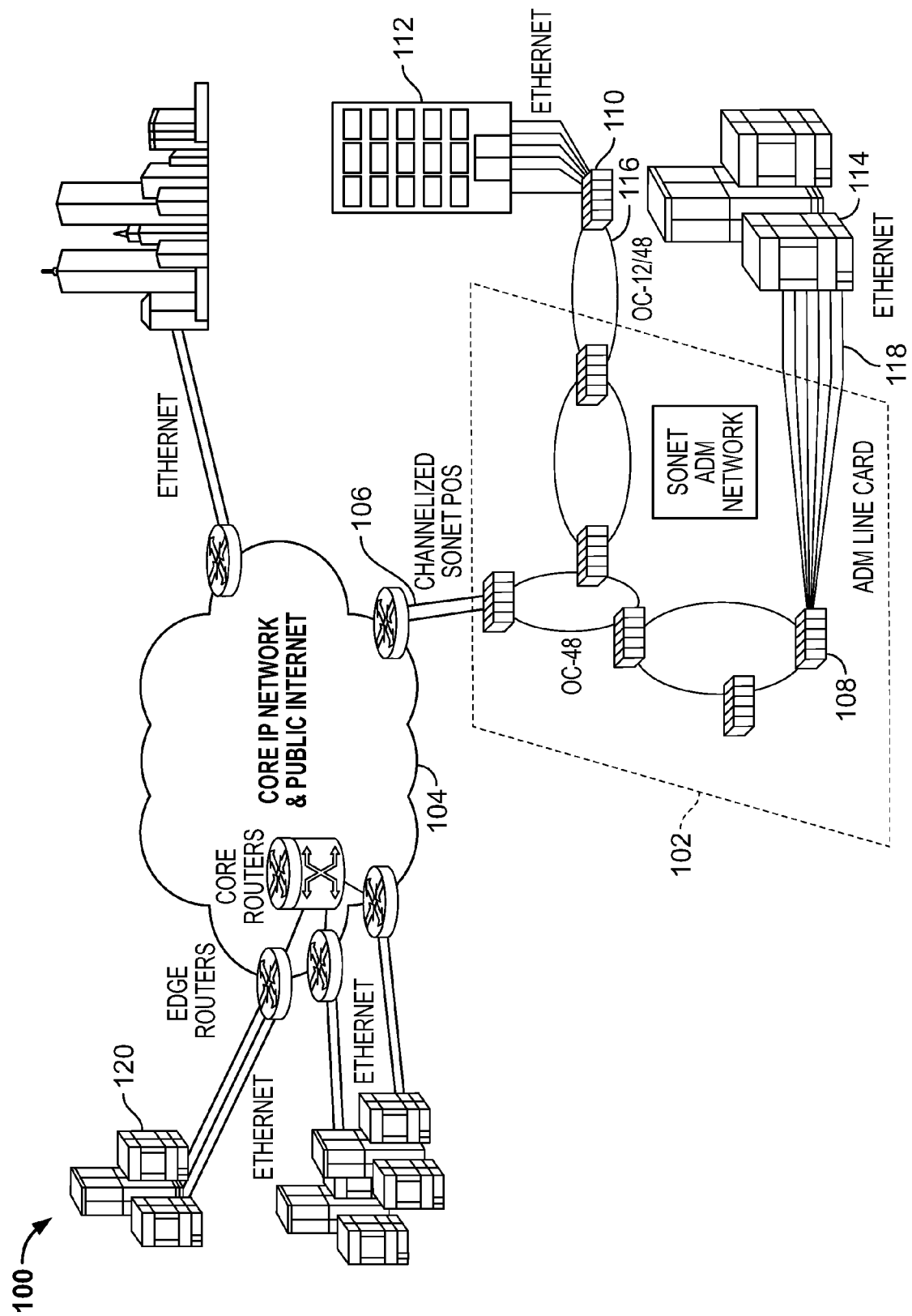
FIG. 1 is a block diagram illustrates the interconnections in an example of a data communications network.

Aspects of the present invention may be seen in FIG. 1, which illustrates the interconnections in an example of a data communications network. As shown in the diagram, portions of the network, such as SONET optical link 106, metropolitan area network connection 116, and SONET ADM Network 102, are synchronous optical network links. Other portions, such as packet connection 118 linking ADM 108 to users 114, and Core IP Network and Public Internet 104, are constructed using a packet network. The fundamental difference in these two forms of data transport may require a means at several points along the transmission path to adapt packetized data for transmission via a synchronous link, and synchronous data for packet transport. For example, packet data traffic from service provider 120 destined for users 112 may be sent in Ethernet packet format from service provider 120 through Core IP Network 104 and directed onto packet-over-SONET link 106. The broadband traffic may then pass through SONET ADM Network 102 onto metropolitan area network 116 to multi-service provisioning platform 110, where it would be mapped into one or more Ethernet packet connections to users 112. Packets flowing from users 112 back to service provider 120 would require similar data format adjustments.

An embodiment of the present invention may provide the functionality needed to allow a broadband synchronous optical network to serve a variety of synchronous and packet network connections in a flexible manner at lower cost than existing alternatives, and may be incorporated into a circuit card in add/drop multiplexer 108. It may also be used to offer Ethernet services in metropolitan markets by leveraging the SONET infrastructure. To support such an application, an embodiment of the present invention may be contained within multi-service provisioning platform (MSPP) 110. In such applications, it may support the use of Ethernet private lines, and advanced Internet protocol (IP) services such as Voice-over-IP (VoIP) telephony. The present invention may also be used to provide advanced remote troubleshooting features on subscriber connections 118.

Figure 2:
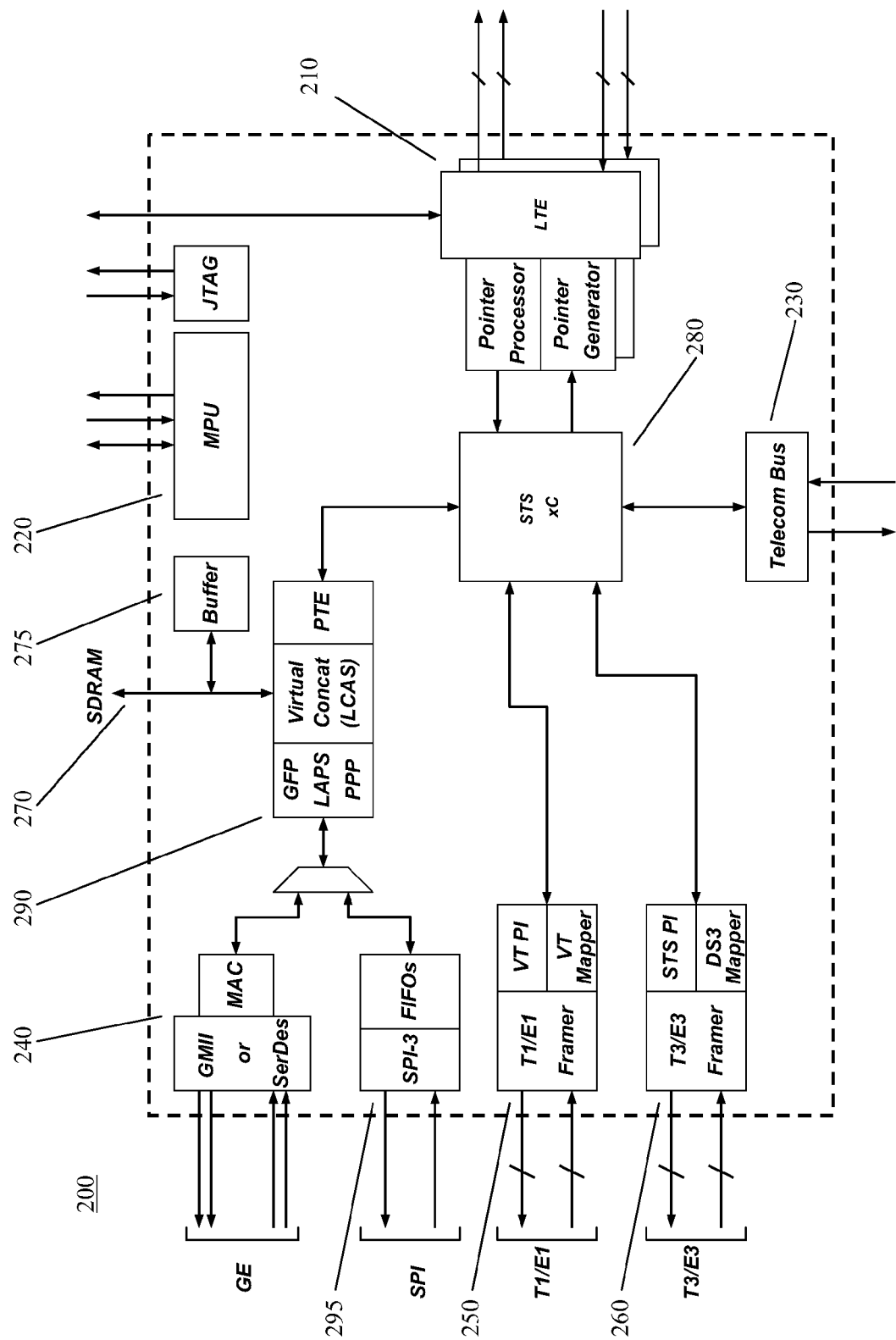
FIG. 2 is a block diagram of an exemplary embodiment of the present invention.

FIG. 2 shows a block diagram illustrating the functional elements in one embodiment of the present invention. An embodiment in accordance with the present invention may support both SONET TDM and Ethernet data services, and may function as an integrated SONET/SDH/PDH/Ethernet Framer/Mapper. It may be a Remote Terminal (or ADM or IAD) on a chip, integrating legacy and Ethernet services with a wide variety of trunk- and client-side interfaces. It may also integrate multiple trunk, client, and service options in one device, eliminating trunk specific customer premises equipment (CPE), service specific CPE, and the need for multiple CPE/services.

Another embodiment of the present invention may be capable of mapping both telecommunications and data communications traffic into Synchronous Optical Network (SONET)/Synchronous Digital Hierarchy (SDH) or Plesiochronous Digital Hierarchy (PDH) transport payloads. It may support protected trunk-side OC-48/STM-16, OC-12/STM-4 and OC-3/STM-1 network interfaces, as well as protected trunk-side DS3/E3 interfaces. An embodiment according to the present invention may also support, for example, eight 10-megabit-per-second (Mbps) or 100 Mbps Ethernet ports, two gigabit-per-second (Gbps/GbE/Gig-E) Ethernet links, and System Packet Interface (SPI-3) (POS-PHY Level 3) interfaces for data services. It may also support, for example, up to 28 DS1/E1 lines and three DS3/E3 interfaces. A Telecom Bus Interface may be provided to support additional client telecommunications or data communications connections.

A further embodiment of the present invention may provide mapping for up to 2.5 Gbps of client-side traffic from a variety of interfaces including, for example, Ethernet packet data interface 240, System Packet Interface 295, T1/E1 data interface 250, T3/E3 data interface 260, and Telecom Bus interface 230. In such an arrangement, traffic originating from or destined for the SONET/SDH trunk on network interface 210 from or to any client side interface, including the Telecom Bus interface 230, may be cross-connected at Virtual Tributary (VT)/Tributary Unit (TU) and Synchronous Transport Signal (STS)/Administrative Unit (AU) granularities by STS cross-connect 280. When using the DS3/E3 data interfaces 260 as trunks, up to 28/21 DS1/E1s may be mapped via M13/E13 multiplexing. Data traffic using High-level Data Link Control (HDLC) encapsulations may also be mapped to the DS3/E3 trunk on T3/E3 data interface 260.

An embodiment according to the present invention may perform all SONET/SDH section and line terminating functions, as well as linear-line protection schemes via network interface 210. Network interface 210 may also support full SONET/SDH pointer processing of any combination of STS-1/AU-3 and concatenated payloads up to 2.5 Gbps. In addition, path-overhead (POH) monitoring and automatic detection of path-level defects may be provided by network interface 210 and packet mapper 290 in order to support Uni-directional Protected Switched Rings (UPSR)/SNCP operation.

Another embodiment of the present invention may support packet mapping functionality in packet mapper 290 with static or dynamic bandwidth allocation for, as an example, two Gigabit Ethernet interfaces 240, as many as eight 10 Mbps/100 Mbps Ethernet interfaces, and may also support an Optical Internetworking Forum (OIF) SPI-3 interface 295. Packets encapsulated using the American National Standards Institute (ANSI) TIX1.5 Generic Framing Procedure (GFP), the International Telecommunications Union (ITU) X.86 recommendation, Link Access Procedure SONET (LAPS), or the Internet Engineering Task Force (IETF) RFC 1662 Point-to-Point Protocol (PPP) may be mapped by packet mapper 290 to a SONET/SDH or a DS3/E3 transport payload carried on network interface 210 or T3/E3 data interface 260. An embodiment according to the present invention may implement backpressure on the Ethernet ports using IEEE 802.3 flow control with programmable trigger thresholds. The functionality of Ethernet packet data interface 240 and packet mapper 290 may provide all necessary statistic counters required to support Simple Network Management Protocol (SNMP) and Internet Engineering Task Force (IETF) Remote Monitoring (RMON) network management activities.

A further embodiment in accordance with the present invention may simultaneously support mixed High-Order (STS) and Low-Order (VT) Virtual Concatenation (VC) with Link Capacity Adjustment Scheme (LCAS) via functionality resident in packet mapper 290. Virtual Concatenation with LCAS may be supported by packet mapper 290 on both data interfaces and may provide, for example, 24 virtual concatenation channels, each comprising up to 48 high order paths (STS-1/AU-3) and up to 336 low order paths (VT1.5 or TU-12). An embodiment of the present invention may support, for example, up to 200 microseconds of differential delay compensation with internal buffer 275, or up to 250 milliseconds with external synchronous dynamic random access memory (SDRAM) connected to external memory interface 270.

An embodiment of the present invention may integrate OC-3/12/48 trunk network interface 210, an STS and VT cross-connect 280, T1/E1 and/or T3/E3 data interfaces 250 and 260, 10 Mbps/100 Mbps/Gigabit Ethernet ports, High and Low-order VC and LCAS functionality in packet mapper 290, and a SPI-3 interface 295 into a single integrated circuit device.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A multi-service mapper framer comprising:
   an integrated chip, comprising:
      at least one on-chip network interface for formatting a receive serial data stream from a synchronous optical communication link receive path, producing a channelized receive data stream, and for formatting a channelized transmit data stream, producing a transmit serial data stream for transmission on a synchronous optical communication link transmit path;
      at least one on-chip cross-connect for de-multiplexing the channelized receive data stream, producing at least one receive data channel, and for multiplexing at least one transmit data channel, producing the channelized transmit data stream;
      at least one on-chip packet mapper for mapping at least one of the at least one receive data channel, producing a receive packet data stream, and for de-mapping a transmit packet data stream, producing at least one of the at least one transmit data channel;
      at least one on-chip packet data interface for packetizing the receive packet data stream producing a receive packet stream, and for de-packetizing a transmit packet stream into the transmit packet data stream;
      at least one on-chip DS1/E1 data interface for framing at least one of the at least one receive data channel, producing a time division multiplexed receive data stream, and for framing a time division multiplexed transmit data stream producing at least one of the at least one transmit data channel;
      at least one on-chip DS3/E3 data interface for framing at least one of the at least one receive data channel, producing a time division multiplexed receive data stream, and for framing a time division multiplexed transmit data stream producing at least one of the at least one transmit data channel;
      at least one on-chip telecom bus interface for transferring data from at least one of the at least one receive data channel to an external device, and for transferring to at least one of the at least one transmit data channel data from the external device; and
      at least one on-chip microprocessor unit arranged in order to allow information to be exchanged with at least one of the at least one network interface, the at least one cross-connect, the at least one packet mapper, the at least one packet data interface, the at least one DS1/E1 interface, the at least one DS3/E3 interface, and the at least one telecom bus interface.

2. The multi-service mapper framer of claim 1, wherein the at least one on-chip network interface is compatible with the Telcordia GR-253-CORE or corresponding later SONET standard.

3. The multi-service mapper framer of claim 1, wherein the at least one on-chip network interface is International Telecommunication Union Synchronous Digital Hierarchy compatible.

4. The multi-service mapper framer of claim 1, wherein the at least one on-chip network interface is capable of supporting at least SONET STS-3 capacity on each of the receive serial data stream and the transmit data stream.

5. The multi-service mapper framer of claim 1, wherein the at least one on-chip network interface supports automatic protection switching compliant with the American National Standards Institute T1.105.01-5000 or corresponding later standard.

6. The multi-service mapper framer of claim 1, wherein the at least one on-chip packet mapper supports virtual concatenation.

7. The multi-service mapper framer of claim 6, wherein the at least one on-chip packet mapper implements a link capacity adjustment scheme.

8. The multi-service mapper framer of claim 1, wherein the at least one on-chip packet mapper implements the American National Standards Institute T1X1.5 or corresponding later generic framing procedure.

9. The multi-service mapper framer of claim 1, wherein the at least one on-chip packet mapper implements the International Telecommunications Union X.86 Ethernet Over SONET recommendation.

10. The multi-service mapper framer of claim 1, wherein the at least one on-chip packet mapper implements the Internet Engineering Task Force RFC 1662 or corresponding later point-to-point protocol specification.

11. The multi-service mapper framer of claim 1, wherein the at least one on-chip packet mapper comprises an interface to permit access to external memory.

12. The multi-service mapper framer of claim 1, wherein the at least one on-chip packet data interface comprises at least one packet interface compatible with the IEEE 802.3z or later equivalent Gigabit Ethernet standard.

13. The multi-service mapper framer of claim 1, wherein at least one of the at least one on-chip DS3/E3 interface may be arranged to operate as a trunk side interface.

14. The multi-service mapper framer of claim 1, wherein each of the outgoing and incoming paths of the at least one on-chip telecom bus interface is of at least STS-3 capacity.

15. A method of operating a multi-service mapper framer, the method comprising:
   performing by an integrated chip, functions comprising:
      framing a receive serial data stream from a synchronous optical communication link receive path into a channelized receive data stream;
      de-multiplexing the channelized receive data stream, producing at least one receive data channel;
      mapping at least one of the at least one receive data channel, producing a receive packet data stream;
      packetizing the receive packet data stream producing a receive packet stream; de-packetizing a transmit packet stream into a transmit packet data stream;
      de-mapping the transmit packet data stream, producing at least one transmit data channel;

multiplexing the at least one transmit data channel, producing a channelized transmit data stream; and formatting the channelized transmit data stream producing a transmit serial data stream for transmission on a synchronous optical communication link transmit path.

16. The method of claim 15, comprising collecting at least one statistic related to the packetizing and de-packetizing actions.

17. The method of claim 15, comprising:

mapping at least one of the at least one receive data channel to a time-division multiplex receive data channel;

multiplexing the time division multiplex receive data channel into a time division multiplex receive signal;

framing a time division multiplex transmit signal into a time division multiplex transmit data channel; and de-mapping the time division multiplex transmit data channel into at least one transmit data channel.

18. A machine-readable memory, having stored thereon a computer program having a plurality of code sections for implementing a multi-service mapper framer, the code sections executable by a machine for causing the machine to perform the operations comprising:

performing by an integrated chip, functions comprising:

framing a receive serial data stream from a synchronous optical communication link receive path into a channelized receive data stream;

de-multiplexing the channelized receive data stream, producing at least one receive data channel;

mapping at least one of the at least one receive data channel, producing a receive packet data stream;

packetizing the receive packet data stream producing a receive packet stream; de-packetizing a transmit packet stream into a transmit packet data stream;

de-mapping the transmit packet data stream, producing at least one transmit data channel;

multiplexing the at least one transmit data channel, producing a channelized transmit data stream; and formatting the channelized transmit data stream producing a transmit serial data stream for transmission on a synchronous optical communication link transmit path.

19. The machine-readable storage of claim 18, comprising collecting at least one statistic related to the packetizing and de-packetizing actions.

20. The machine-readable storage of claim 18, comprising:

mapping at least one of the at least one receive data channel to a time-division multiplex receive data channel;

multiplexing the time division multiplex receive data channel into a time division multiplex receive signal;

framing a time division multiplex transmit signal into a time division multiplex transmit data channel; and de-mapping the time division multiplex transmit data channel into at least one transmit data channel.

* * * * *

UNITED STATES PATENT AND TRADEMARK OFFICE
CERTIFICATE OF CORRECTION

| | | |
|---|---|---|
| PATENT NO. | : 8,265,093 B2 | Page 1 of 1 |
| APPLICATION NO. | : 12/511000 | |
| DATED | : September 11, 2012 | |
| INVENTOR(S) | : Jean-Marc Guy Patenaude | |

It is certified that error appears in the above-identified patent and that said Letters Patent is hereby corrected as shown below:

In the Claims

In column 10, claim 20, line 19, after "machine-readable" replace "storage" with --memory--.

Signed and Sealed this
Twenty-ninth Day of January, 2013

David J. Kappos
*Director of the United States Patent and Trademark Office*